US009026073B2

(12) United States Patent
He

(10) Patent No.: US 9,026,073 B2
(45) Date of Patent: May 5, 2015

(54) DEVICE FOR RECEIVING SIGNALS, ANTENNA DEVICE AND MOBILE TERMINAL

(75) Inventor: Wenqing He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 13/522,039

(22) PCT Filed: Sep. 7, 2010

(86) PCT No.: PCT/CN2010/076677
§ 371 (c)(1), (2), (4) Date: Jul. 13, 2012

(87) PCT Pub. No.: WO2012/000231
PCT Pub. Date: Jan. 5, 2012

(65) Prior Publication Data

US 2013/0028456 A1 Jan. 31, 2013

(30) Foreign Application Priority Data

Jul. 1, 2010 (CN) .......................... 2010 1 0221307

(51) Int. Cl.
*H04B 1/18* (2006.01)
*H01Q 1/24* (2006.01)
*H01Q 1/46* (2006.01)

(52) U.S. Cl.
CPC . *H01Q 1/243* (2013.01); *H01Q 1/46* (2013.01)

(58) Field of Classification Search
CPC ........................................................ H04B 1/18
USPC .................................. 455/193.1, 289, 562.1
See application file for complete search history.

(56) References Cited

U.S. PATENT DOCUMENTS

| | | | | |
|---|---|---|---|---|
| 3,863,157 | A | 1/1975 | Quinlan et al. | |
| 7,558,607 | B2 * | 7/2009 | Edeler et al. | 455/575.2 |
| 7,574,187 | B2 | 8/2009 | Hyatt et al. | |
| 8,270,921 | B2 * | 9/2012 | Dubash et al. | 455/192.2 |
| 2007/0281756 | A1 | 12/2007 | Hyatt et al. | |
| 2008/0254831 | A1 | 10/2008 | Mukai | |
| 2009/0252348 | A1 | 10/2009 | Glissman | |

FOREIGN PATENT DOCUMENTS

| | | | |
|---|---|---|---|
| CN | 101316111 | A | 12/2008 |
| CN | 201360261 | Y | 12/2009 |
| CN | 101764280 | A | 6/2010 |
| JP | 07143213 | A * | 6/1995 |

(Continued)

OTHER PUBLICATIONS

English Translation of the Written Opinion of the International Search Authority in international application No. PCT/CN2010/076677, mailed on Apr. 7, 2011.
International Search Report in international application No. PCT/CN2010/076677, mailed on Apr. 7, 2011.

(Continued)

*Primary Examiner* — Alexander Jamal
(74) *Attorney, Agent, or Firm* — Oppedahl Patent Law Firm LLC

(57) ABSTRACT

The disclosure discloses a device for receiving signals, which includes: equipment with lead wires configured to be reused as a receiving antenna to receive Frequency Modulation (FM) signals. The disclosure further discloses an antenna device and a mobile terminal. According to the technical solution of the disclosure, occupied space of a receiving antenna for FM signal is reduced greatly.

6 Claims, 3 Drawing Sheets

(56) References Cited

FOREIGN PATENT DOCUMENTS

| | | | |
|---|---|---|---|
| JP | 2007194803 | A | 8/2007 |
| WO | 2008054877 | A2 | 5/2008 |

OTHER PUBLICATIONS

Supplementary European Search Report in European application No. 10853934.7, mailed on Oct. 22, 2012.

* cited by examiner

DEVICE FOR RECEIVING SIGNALS, ANTENNA DEVICE AND MOBILE TERMINAL

TECHNICAL FIELD

The disclosure relates to a signal receiving technology of a mobile terminal, and in particular to a device for receiving signals, an antenna device and a mobile terminal.

BACKGROUND

In the related art, a mobile terminal generally has a function of receiving Frequency Modulation (FM) signals. A terminal with a function of receiving FM signals is provided in A patent application (application No. 20081004083.6, and entitled “mobile terminal earphone”) discloses a terminal with a function of receiving FM signals, wherein an FM antenna of the terminal is realized by the earphone, namely FM signals are received by the earphone. The defect of the method is that: because an earphone line is long and an earphone needs to be worn when radio is listened each time, certain inconvenience can be brought to a user; in addition, a cost of the earphone is high, if the earphone is removed, the terminal utilizing the method cannot receive FM signals.

A patent application (application No. 200920105948.8, and entitled “FM antenna and terminal”) discloses a terminal for receiving signals by utilizing a built-in FM antenna, wherein, the FM antenna is placed externally, and a built-in antenna is specifically designed for receiving the FM signals, wherein the built-in antenna is realized by winding two different enameled wires on a fixed plastic board or a Printed Circuit Board (PCB). The method solves the problem that a mobile terminal in the related art can listen to FM radio by only establishing connection with a wired earphone. However, the terminal according to the method occupies a larger internal space, and manufactures of the antenna and the terminal are not convenient to realize, so that a cost of the FM antenna is increased.

SUMMARY

In view of the problem above, the disclosure mainly aims to provide a device for receiving signals, an antenna device, and a mobile terminal, capable of greatly reducing occupied space of a receiving antenna for FM signals.

In order to achieve the purpose above, the technical solution of the disclosure is realized as follows.

The disclosure provides a device for receiving the signals, which includes:

equipment with lead wires, configured to be reused as a receiving antenna to receive Frequency Modulation (FM) signals.

In the device, the equipment with lead wires may be equipment connected with a mainboard of the mobile terminal through the lead wires in the mobile terminal.

In the device, that the equipment with the lead wires is reused as a receiving antenna to receive the FM signals may specifically include that:

a lead wire is pulled from the equipment with lead wires in a mobile terminal; the lead wire is connected with a base electrode of a Low Noise Amplifier (LNA); and the equipment with lead wires serves as a receiving antenna for FM signals, receives FM signals and transmits the received FM signals to an antenna matching network.

The disclosure provides an antenna device, which includes:

equipment with lead wires, an antenna matching network, a Low Noise Amplifier (LNA), and a Frequency Modulation (FM) chip, wherein the equipment with lead wires is configured to be reused as a receiving antenna to receive FM signals;

the antenna matching network is configured to debug a receiving performance of the receiving antenna;

the LNA is configured to increase a signal-to-noise ratio of the FM signals; and the FM chip is configured to demodulate the FM signals received by the equipment with lead wires and transmit audio signals obtained after demodulating to a speaker.

In the device, that the equipment with lead wires is reused as a receiving antenna to receive the FM signals may specifically include that:

a lead wire is pulled from the equipment with lead wires in a mobile terminal; the lead wires are connected with a base electrode of the LNA; and the equipment with lead wires serves as a receiving antenna for FM signals, receives FM signals and transmits the received FM signals to the antenna matching network.

In the device, that the antenna matching network debugs the receiving performance of the receiving antenna may specifically include that:

the antenna matching network receives FM signals transmitted from the receiving antenna and performs blocking processing on the FM signals, and debugs the receiving performance of the receiving antenna by adjusting values of an inductance and a capacitance in the antenna matching network.

In the device, that the LNA increases the signal-to-noise ratio of the FM signals may specifically include that:

the LNA performs blocking processing on the FM signals by utilizing a capacitor of an LNA circuit and amplifies the FM signals which have been subjected to the blocking processing performed by the capacitor by a triode of the LNA circuit; and the LNA performs blocking processing on the FM signals amplified by the triode by utilizing the capacitor of the LNA circuit and then transmit the FM signals to the FM chip.

In the device, that the FM chip demodulates the FM signals received by the equipment with lead wires may specifically include that:

the FM chip performs detection on the FM signals received and filters noise in the FM signals to obtain audio signals used for playing.

The disclosure provides a mobile terminal, which includes a display screen, a power supply, a keyboard, a shell and a mainboard and further includes equipment with lead wires, an antenna matching network, a Low Noise Amplifier (LNA) and a Frequency Modulation (FM) chip, wherein the equipment with lead wires is configured to be reused as a receiving antenna to receive FM signal;

the antenna matching network is configured to debug a receiving performance of the receiving antenna;

the LNA is configured to increase a signal-to-noise ratio of the FM signals; and the FM chip is configured to demodulate the FM signals received by the equipment with lead wires and transmit audio signals obtained after demodulating to a speaker.

In the mobile terminal, the mobile terminal may further include:

a speaker configured to play received audio signals.

In the device for receiving signals, the antenna device and the mobile terminal provided by the disclosure, the equipment with lead wires in the mobile terminal is reused as the receiving antenna and is configured to receive the FM signals, so that a cost caused by a receiving function of the FM signals can be reduced to the greatest extent and idle resources of the mobile terminal are further greatly saved. Moreover, when there is no space for placing an FM signal receiving antenna on the mobile terminal, the design of placing the antenna externally still can be realized simply and efficiently.

In addition, in the embodiment of the disclosure, equipment with lead wires, such as a speaker or a motor, can be used as a receiving antenna; as long as the speaker can make a sound or the motor can vibrate, the equipment with lead wires is in a good connection state; and because the implementation of basic functions can be ensured, poor contact caused by a twisting of the receiving antenna and the like does not need to be worried about.

DETAILED DESCRIPTION

The basic idea of the disclosure is that: equipment with lead wires is reused as a receiving antenna to receive FM signals.

The disclosure will be further described in detail with reference to the accompanying drawings and embodiments hereinafter.

Figure 1:
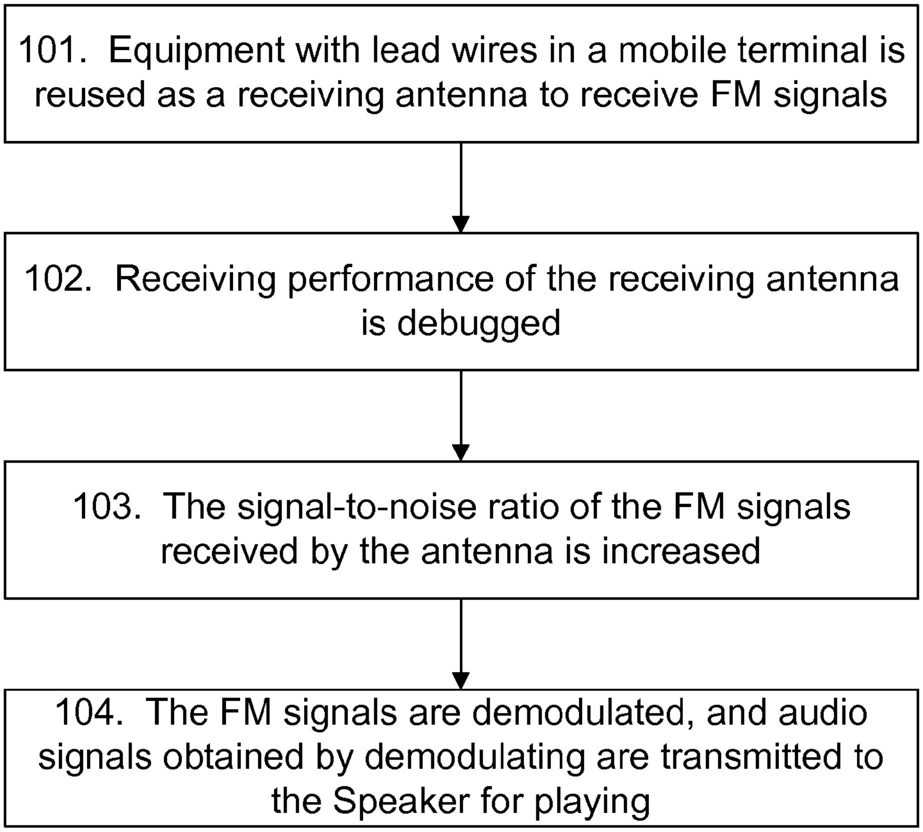
FIG. 1 is a flowchart of a method for receiving signals according to the disclosure.

FIG. 1 is a flowchart of a method for receiving signals according to the disclosure; as shown in FIG. 1, the method for receiving signals includes the following steps.

Step 101, equipment with lead wires in a mobile terminal is reused as a receiving antenna to receive FM signals;

specifically, existing equipment with lead wires in the mobile terminal is reused as an antenna for receiving FM signals to receive FM signals; herein, as long as equipment which is connected with a mainboard of the mobile terminal through a lead wire in the mobile terminal can be called equipment with lead wires, such as a Speaker, a motor, a flexible circuit board used for connecting signals of a plurality of circuits, a Light Emitting Diode (LED) and the like; a large amount of experiments show that, a length of the lead wire of equipment with lead wires has great influence on receiving performance of FM signals, and the length is directly relative to an FM signal receiving efficiency of a receiving antenna, so as to influence the receiving performance of the FM signals; in a practical application, when the length of the lead wire is generally greater than 30 mm, debugged performance of the FM signal receiving antenna can be received; and if the length of the lead wire reaches 60 mm, then the debugged performance of the FM signal receiving antenna is better.

Figure 2:
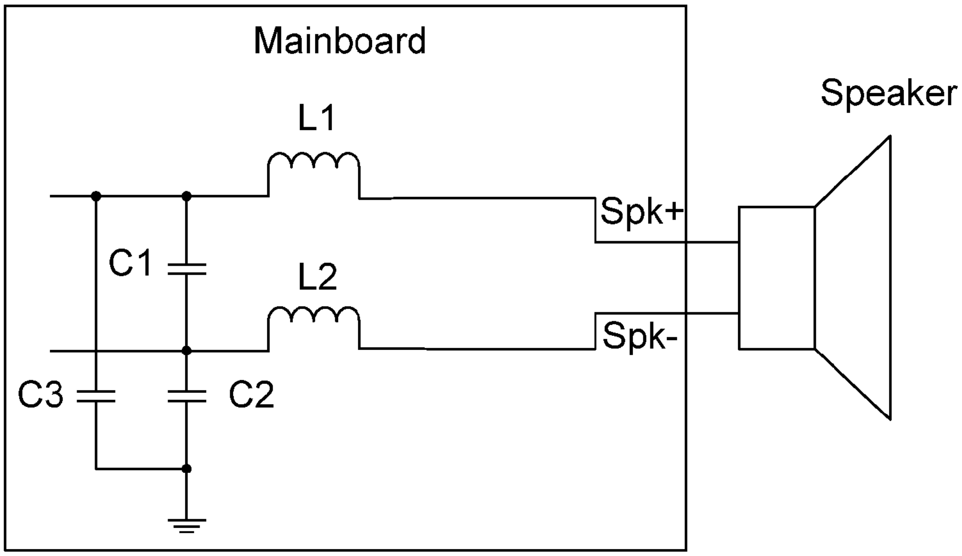
FIG. 2 illustrates a schematic diagram of connection between a Speaker and a circuit on a mainboard of a mobile terminal in the related art.

In the related art, a Speaker of a mobile terminal is only used for playing audio; FIG. 2 is a schematic diagram of connection between a Speaker and a circuit on a mainboard of a mobile terminal in the related art; as shown in FIG. 2, two lead wires of the Speaker are respectively connected with a positive input end (Spk+) and a negative input end (Spk−) relative to audio playback on the mainboard of the mobile terminal; and the connection mode generally has two modes, i.e., welding and crimping, wherein the welding mode is more reliable.

According to a signal receiving principle of the antenna, as long as a metal which can be excited an induction current, such as a metal piece, a metal wire or the like, can serve as an antenna; and a Speaker is taken as an example to show how to receive FM signals by utilizing the Speaker as a receiving antenna; on the basis of the Speaker serving as the speaker, a lead wire is pulled from the Spk+ or the Spk−, and finally the lead wire is connected with a base electrode (b) of a Low Noise Amplifier (LNA) to realize reusing of the Speaker: the Speaker not only serves as a speaker of the mobile terminal and but also serves as an FM signal receiving antenna of the mobile terminal with the lead wire together; when the Speaker and the lead wire serve as the FM signal receiving antenna, the lead wire connected with the LNA, on the Spk+ or the Spk−, has a metal wire, so the Speaker and the lead wire thereof can receive the FM signals and the FM signals flow into an antenna matching network from the Spk+ or the Spk−; in addition, a magnetic core coil in the Speaker can further enhance an receiving effect of the FM signals.

Figure 3:
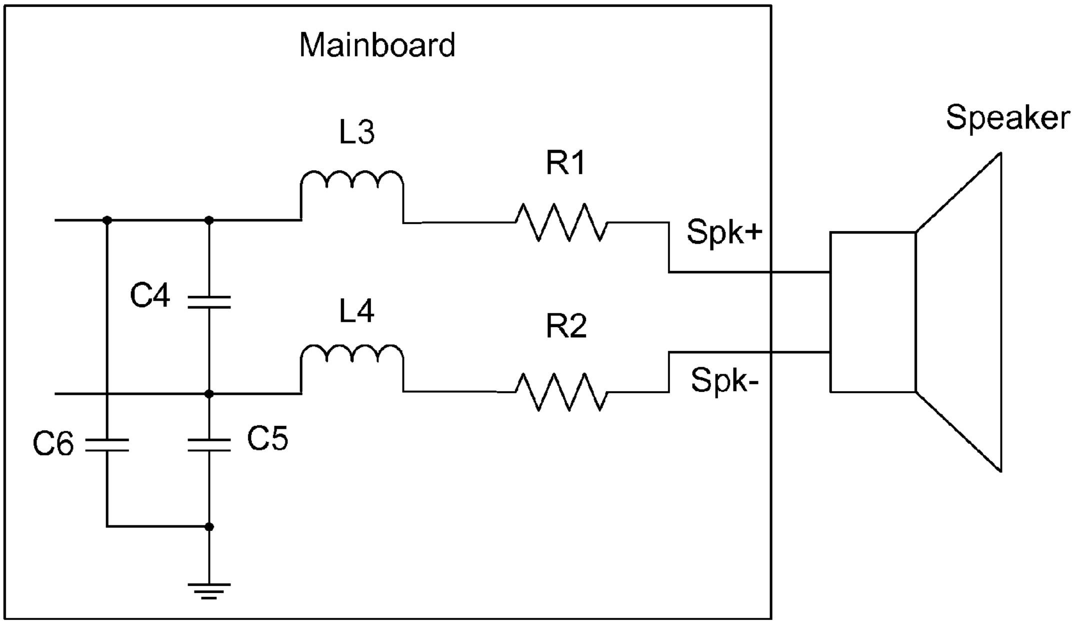
FIG. 3 illustrates a schematic diagram of a circuit improved on a circuit in which a Speaker serves as a speaker according to the disclosure.

Because of reusing the Speaker, an impedance of the circuit in which the Speaker serves as a speaker and an impedance of the FM signal receiving circuit in which the Speaker and the lead wire serve as the receiving antenna for the FM signals are very close in an FM signal frequency band, so that the circuit in which the Speaker serves as the speaker can shunt the FM signals received by the receiving antenna to cause great attenuation of the FM signals entering the FM signal receiving circuit and reduce the receiving effect of the FM signals; therefore, the circuit in which the Speaker serves as the speaker needs to be improved, that is, two magnetic beads are added on the basis of FIG. 2 to prevent the FM signals from entering the circuit in which the Speaker serves as the speaker, thereby preventing the great attenuation of the FM signals entering the FM signal receiving circuit; FIG. 3 is a schematic diagram of a circuit improved on a circuit in which a Speaker serves as a speaker according to the disclosure; as shown in FIG. 3, a magnetic bead R1 is added between an inductor L3 and the Spk+, and a magnetic R2 is added between an inductor L4 and the Spk−; the magnetic bead is different from a resistor: the magnetic bead has hardly any resistance in a situation of direct current and has a high impedance at a high frequency, and the resistance of the magnetic bead changes along with the change of the frequency, while the resistance of the resistor is the same no matter in the situation of the direct current or at the high frequency; in a practical application, the used magnetic beads are preferably the magnetic beads having the impedance of below 0.5 ohms in the situation of the direct current and having the impedance of above 1500 ohms at the high frequency (such as 100 MHz).

Figure 4:
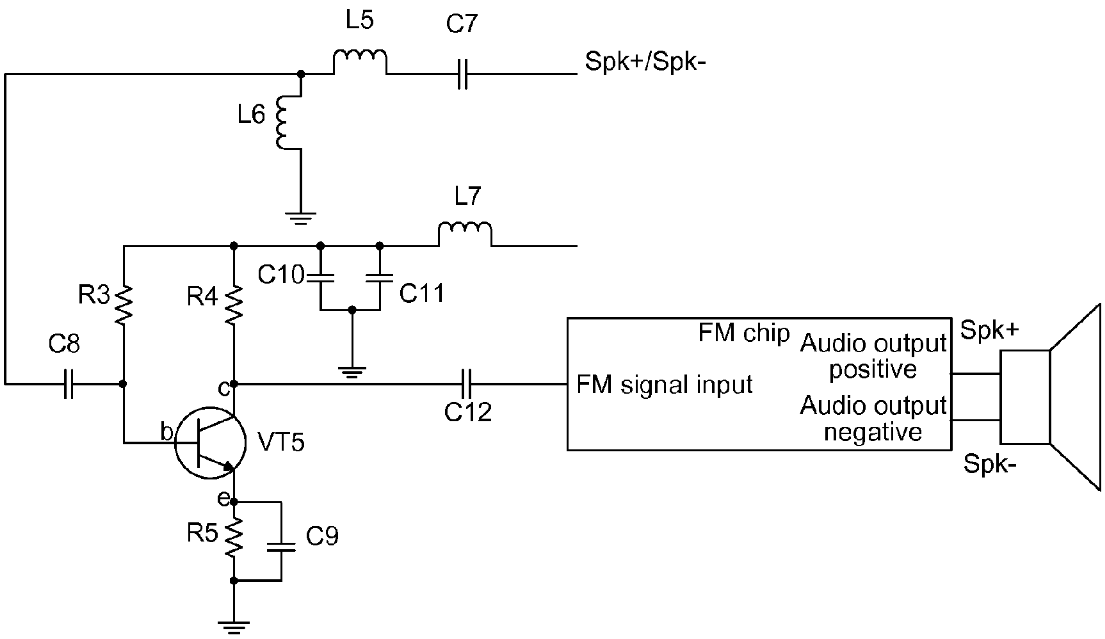
FIG. 4 illustrates a schematic diagram of a receiving circuit of FM signals according to the disclosure.

Step 102, receiving performance of the receiving antenna is debugged;

specifically, in order to make the receiving performance of the receiving antenna reach optimal, the antenna matching network needs to debug the receiving performance of the receiving antenna; two debugging methods are provided: the first debugging method is that one inductor is connected in series and simultaneously one inductor is connected in parallel, and the inductor in parallel is grounded; and the second debugging method is that one inductor is connected in series and simultaneously one capacitor is connected in parallel, and the capacitor in parallel is grounded; and by changing the values of the capacitance and the inductance, the playback effect of the FM signals is audited and verified to realize the debugging of the receiving performance of the receiving antenna;

FIG. 4 is a schematic diagram of a receiving circuit of FM signals according to the disclosure, which includes schematic diagrams of a circuit for debugging receiving performance of a receiving antenna and a circuit for increasing a signal-to-noise ratio of FM signals received by the antenna; as shown in FIG. 4, the first debugging method is adopted, the antenna matching network receives FM signals received by the Speaker serving as the receiving antenna, because the FM signals have direct-current components, if a blocking processing is not performed, a short circuit can be caused by the direct-current components so as to burn out the Speaker, the blocking processing is performed on the FM signals by a capacitor C7 in the antenna matching network circuit; the FM signals reach an inductor L5 after passing through the capacitor C7, and then reach an inductor L6 and a capacitor C8 respectively; and the receiving performance of the receiving antenna is debugged by adjusting the values of the inductor L5 and the inductor L6.

Step 103, the signal-to-noise ratio of the FM signals received by the antenna is increased;

specifically, in order to further improve the quality of the FM signals, the FM signals are further debugged by utilizing an LNA circuit, that is, the FM signals received by the antenna are amplified to improve the signal-to-noise ratio of the FM signals; as shown in FIG. 4, the FM signals reach the capacitor C8, and the capacitor C8 performs the blocking processing on the FM signals passing through the inductor L5, so as to prevent that a base electrode (b) of a triode VT5 is short circuit to ground (direct current); the FM signals which have been subjected to the blocking processing of the capacitor C8 reach the triode VT5; the triode VT5 amplifies the FM signals so as to improve the signal-to-noise ratio of the FM signals; the FM signals amplified by the triode VT5 flow to a capacitor C12 from a collector electrode (c) of the triode VT5, and the capacitor C12 performs the blocking processing on the FM signals and then transmits the FM signals to an FM chip; a resistor R3, a resistor R4 and a resistor R5 are direct-current bias resistors of a triode VT5 amplifying circuit, a capacitor C9 is a bypass capacitor, and an inductor L7, a capacitor C10 and a capacitor C11 are a choke inductor and filter capacitors for supplying power to the LNA circuit respectively.

Step 104, the FM signals are demodulated, and audio signals obtained by demodulating are transmitted to the Speaker for playing;

specifically, as shown in FIG. 4, the FM signals finally flow into the FM chip through an FM signal input pin of the FM chip; since a noise ratio in the amplified FM signals is high, the FM signals need to be demodulated by the FM chip, that is, the FM chip performs detection on the received FM signals to filter a noise part in the FM signals and obtain the audio signals used for playing from the FM signals; the audio output positive pin of the FM chip is connected with the Spk+ of the speaker, the audio output negative pin of the FM chip is connected with the Spk− of the speaker, and the FM chip transmits the audio signals to the Speaker for playing through the audio output positive pin and the audio output negative pin; and the FM chip in the embodiment can exist independently and can also be integrated with other chips; for example, the FM chip can be integrated with a baseband processing chip of a mobile terminal, a WiFi chip, or a Bluetooth chip, and also can be integrated with the FM chip, the WiFi chip and the Bluetooth chip together.

In order to implement the method above, the disclosure further provides a device for receiving signals, wherein the device includes that:

equipment with lead wires, configured to be reused as a receiving antenna to receive Frequency Modulation (FM) signals.

the equipment with lead wires is equipment connected with a mainboard of the mobile terminal through the lead wires in the mobile terminal.

That the equipment with the lead wires is reused as a receiving antenna to receive the FM signals specifically includes that: a lead wire is pulled from the equipment with lead wires in a mobile terminal; the lead wire is connected with a base electrode of a Low Noise Amplifier (LNA); and the equipment with lead wires serves as a receiving antenna for FM signals, receives FM signals and transmits the received FM signals to an antenna matching network.

Figure 5:
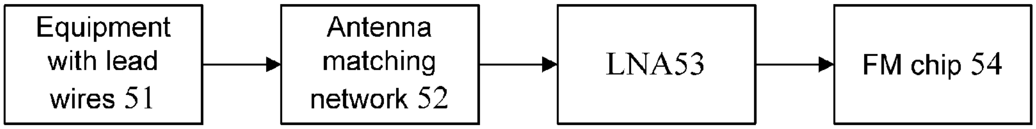
FIG. 5 illustrates a structural diagram of an antenna device according to the disclosure.

The disclosure further provides an antenna device. FIG. 5 is a structural diagram of an antenna device according to the disclosure. As shown in FIG. 5, the antenna device includes: equipment with lead wires 51, an antenna matching network 52, a Low Noise Amplifier (LNA) 53, and a Frequency Modulation (FM) chip 54, wherein the equipment with lead wires 51 is configured to be reused as a receiving antenna to receive FM signals;

the antenna matching network 52 is configured to debug a receiving performance of the receiving antenna;

the LNA 53 is configured to increase a signal-to-noise ratio of the FM signals; and the FM chip 54 is configured to demodulate the FM signals and transmits audio signals obtained after demodulating to a speaker;

herein, that the equipment with lead wires 51 in the antenna device is reused as a receiving antenna to receive the FM signals includes that: a lead wire is pulled out from the equipment with the lead wires 51 in a mobile terminal; the lead wire is connected with a base electrode with the LNA 53; and the equipment with the lead wires 51 serves as a receiving antenna for the FM signals, receives FM signals and transmits the FM signals to the antenna matching network 52; and the equipment with lead wires is equipment connected with a mainboard of the mobile terminal through the lead wires in the mobile terminal.

That the antenna matching network 52 debugs the receiving performance of the receiving antenna includes that: the antenna matching network 52 receives FM signals received by the receiving antenna; a capacitor in the antenna matching network circuit performs blocking processing on the FM signals; and the receiving performance of the receiving antenna is debugged by adjusting the values of an inductance and a resistance.

That the LNA 53 increases the signal-to-noise ratio of the FM signals includes that: the LNA performs blocking processing on the FM signals by utilizing a capacitor and amplifies the FM signals which have been subjected to the blocking processing performed by the capacitor by utilizing a triode; and the LNA performs blocking processing on the FM signals amplified by the triode by utilizing the capacitor and then transmit the FM signals to the FM chip 54.

That the FM chip 54 demodulates the FM signals received by the equipment with lead wires includes that: the FM chip 54 performs detection on the FM signals received and filters noise in the FM signals to obtain audio signals used for playing.

Figure 6:
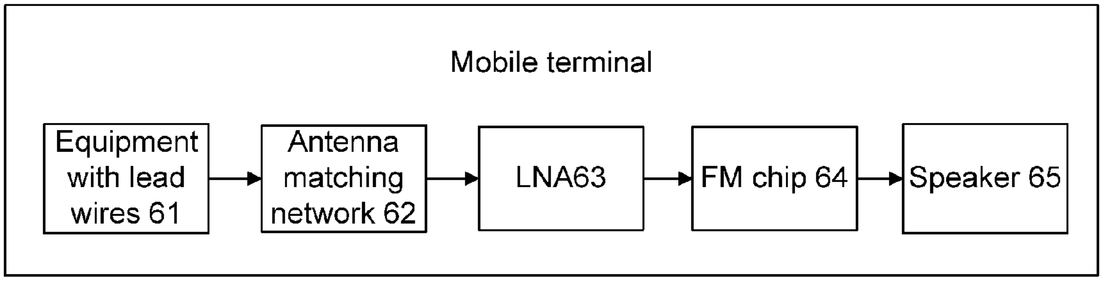
FIG. 6 illustrates a structural diagram of a mobile terminal according to the disclosure.

The disclosure further provides a mobile terminal, which includes a display screen, a power supply, a keyboard, a shell and a mainboard. FIG. 6 is a structural diagram of a mobile terminal according to the disclosure. As shown in FIG. 6, the mobile terminal further includes: equipment with lead wires 61, an antenna matching network 62, an LNA 63 and an FM chip 64, wherein the equipment with lead wires 61 is configured to be reused as a receiving antenna to receive FM signals;

the antenna matching network 62 is configured to debug a receiving performance of the receiving antenna;

the LNA 63 is configured to increase a signal-to-noise ratio of the FM signals; and the FM chip 64 is configured to demodulate the FM signals received by the equipment with lead wires 61, and transmit audio signals obtained after demodulating to a speaker;

the mobile terminal further includes: a speaker 65 configured to play received audio signals.

The above are only the preferred embodiment of the disclosure and are not intended to limit the scope of protection of the disclosure, and any modification, equivalent replacement, improvement and the like within the spirit and principle of the invention shall fall within the scope of protection of the disclosure.

The invention claimed is:

1. An antenna device, comprising equipment with lead wires, an antenna matching network, a Low Noise Amplifier (LNA), and a Frequency Modulation (FM) chip, wherein the equipment with lead wires is configured to be reused as a receiving antenna to receive FM signals;

the antenna matching network is configured to debug a receiving performance of the receiving antenna;

the LNA is configured to increase a signal-to-noise ratio of the FM signals; and the FM chip is configured to demodulate the FM signals received by the equipment with lead wires and transmit audio signals obtained after demodulating to a speaker;

wherein the LNA increases the signal-to-noise ratio of the FM signals in a manner that:

the LNA performs blocking processing on the FM signals by utilizing a capacitor of an LNA circuit and amplifies the FM signals which have been subjected to the blocking processing performed by the capacitor by a triode of the LNA circuit; and the LNA performs blocking processing on the FM signals amplified by the triode by utilizing the capacitor of the LNA circuit and then transmit the FM signals to the FM chip.

2. The device according to claim 1, wherein the equipment with lead wires is reused as a receiving antenna to receive FM signals, specifically:

a lead wire is pulled from the equipment with lead wires in a mobile terminal; the lead wire is connected with a base electrode of the LNA; and the equipment with lead wires serves as a receiving antenna for FM signals, receives FM signals and transmits the FM signals received to the antenna matching network.

3. The device according to claim 1, wherein the antenna matching network debugs the receiving performance of the receiving antenna, specifically:

the antenna matching network receives FM signals transmitted from the receiving antenna and performs blocking processing on the FM signals, and debugs the receiving performance of the receiving antenna by adjusting values of an inductance and a capacitance in the antenna matching network.

4. The device according to claim 1, wherein the FM chip demodulates the FM signals received by the equipment with lead wires, specifically:

the FM chip performs detection on the FM signals received and filters noise in the is FM signals to obtain audio signals used for playing.

5. A mobile terminal, comprising equipment with lead wires, an antenna matching network, a Low Noise Amplifier (LNA) and a Frequency Modulation (FM) chip, wherein the equipment with lead wires is configured to be reused as a receiving antenna to receive FM signals;

the antenna matching network is configured to debug a receiving performance of the receiving antenna;

the LNA is configured to increase a signal-to-noise ratio of the FM signals; and the FM chip is configured to demodulate the FM signals received by the equipment with lead wires, and transmit audio signals obtained after demodulating to a speaker;

wherein the LNA increases the signal-to-noise ratio of the FM signals in a manner that:

the LNA performs blocking processing on the FM signals by utilizing a capacitor of an LNA circuit and amplifies the FM signals which have been subjected to the blocking processing performed by the capacitor by a triode of the LNA circuit; and the LNA performs blocking processing on the FM signals amplified by the triode by utilizing the capacitor of the LNA circuit and then transmit the FM signals to the FM chip.

6. The mobile terminal according to claim 5, further comprising:

a speaker configured to play received audio signals.

* * * * *